(12) United States Patent
Adereth et al.

(10) Patent No.: US 7,564,458 B2
(45) Date of Patent: Jul. 21, 2009

(54) SYSTEM AND METHOD FOR INTERACTIVELY LINKING DATA TO SHAPES IN A DIAGRAM

(75) Inventors: Matthew T. Adereth, Redmond, WA (US); Abraham Mathew, Edmonds, WA (US); Heidi McAllister, Brier, WA (US); Heidi Munson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 11/012,875

(22) Filed: Dec. 15, 2004

(65) Prior Publication Data

US 2006/0125827 A1    Jun. 15, 2006

(51) Int. Cl.
    *G06T 11/20*    (2006.01)
(52) U.S. Cl. .................... 345/440; 345/441; 345/674
(58) Field of Classification Search ............... 345/674, 345/440, 441
    See application file for complete search history.

(56) References Cited

U.S. PATENT DOCUMENTS

| | | | | | |
|---|---|---|---|---|---|
| 4,813,013 | A | * | 3/1989 | Dunn | 715/763 |
| 5,070,534 | A | * | 12/1991 | Lascelles et al. | 715/764 |
| 5,285,192 | A | * | 2/1994 | Johary et al. | 345/699 |
| 5,394,516 | A | * | 2/1995 | Winser | 345/419 |
| 5,481,665 | A | * | 1/1996 | Okada et al. | 715/745 |
| 5,481,741 | A | * | 1/1996 | McKaskle et al. | 345/522 |
| 5,546,507 | A | * | 8/1996 | Staub | 706/60 |
| 5,588,108 | A | * | 12/1996 | Kumar et al. | 715/765 |
| 5,606,657 | A | * | 2/1997 | Dennison et al. | 345/501 |
| 5,613,122 | A | * | 3/1997 | Burnard et al. | 713/1 |
| 5,875,331 | A | * | 2/1999 | Lindsey | 717/108 |
| 5,883,639 | A | * | 3/1999 | Walton et al. | 345/473 |
| 6,215,502 | B1 | * | 4/2001 | Ferguson | 345/648 |
| 6,289,299 | B1 | * | 9/2001 | Daniel et al. | 703/21 |
| 6,314,093 | B1 | * | 11/2001 | Mann et al. | 370/351 |
| 6,377,263 | B1 | * | 4/2002 | Falacara et al. | 345/473 |
| RE37,722 | E | * | 5/2002 | Burnard et al. | 713/1 |

(Continued)

FOREIGN PATENT DOCUMENTS

EP    1 462 936    9/2004

OTHER PUBLICATIONS

Microsoft Excel 2000, "About Chart" pp. 1-3, copyright 1985-1999 Microsoft corporation.*

(Continued)

*Primary Examiner*—Javid A Amini
(74) *Attorney, Agent, or Firm*—Perkins Coie LLP

(57) ABSTRACT

A facility for linking data from an external data source to shapes in a diagram is provided. The facility is implemented as a component of a graphical visualization program, and provides a modeless data window that is operable to display data from a data source through a two dimensional table. Users can use the facility to import data from a data source and display the imported data in the modeless data window. Users can then use the modeless data window to select and drag rows displayed in the modeless data window onto shapes on a drawing surface of the graphical visualization program to link the dragged rows to the shapes. Users can also drag rows displayed in the modeless data window onto a blank section of the drawing surface to create shapes on the drawing surface and link the rows to the created shapes.

19 Claims, 8 Drawing Sheets

U.S. PATENT DOCUMENTS

| | | | |
|---|---|---|---|
| 6,512,519 B1* | 1/2003 | Arsenault et al. | 345/441 |
| 6,545,676 B1* | 4/2003 | Ryan et al. | 345/423 |
| 6,674,440 B1* | 1/2004 | Kirkland et al. | 345/503 |
| 6,720,978 B2* | 4/2004 | Peng et al. | 345/658 |
| 6,738,079 B1* | 5/2004 | Kellerman et al. | 715/763 |
| 6,750,864 B1* | 6/2004 | Anwar | 345/440 |
| 7,185,313 B1* | 2/2007 | Burke et al. | 717/104 |
| 7,277,572 B2* | 10/2007 | MacInnes et al. | 382/154 |
| 2002/0010571 A1* | 1/2002 | Daniel et al. | 703/21 |
| 2003/0191765 A1* | 10/2003 | Bargh et al. | 707/100 |
| 2004/0018489 A1* | 1/2004 | Ma et al. | 435/6 |
| 2004/0019853 A1* | 1/2004 | Takizawa et al. | 715/523 |
| 2004/0027350 A1* | 2/2004 | Kincaid et al. | 345/440 |
| 2004/0061702 A1* | 4/2004 | Kincaid | 345/440 |
| 2004/0184099 A1* | 9/2004 | Silverbrook et al. | 358/1.15 |
| 2004/0190092 A1* | 9/2004 | Silverbrook et al. | 358/539 |
| 2004/0215587 A1* | 10/2004 | Bertrand et al. | 706/59 |
| 2004/0236446 A1* | 11/2004 | Sato et al. | 700/97 |
| 2005/0013462 A1* | 1/2005 | Rhoads | 382/100 |
| 2005/0022147 A1* | 1/2005 | Sato et al. | 716/11 |
| 2005/0134598 A1* | 6/2005 | Baxter et al. | 345/582 |
| 2006/0020538 A1* | 1/2006 | Ram et al. | 705/37 |
| 2006/0161814 A1* | 7/2006 | Wocke et al. | 714/26 |
| 2006/0206860 A1* | 9/2006 | Dardinski et al. | 717/105 |
| 2006/0206866 A1* | 9/2006 | Eldrige et al. | 717/122 |

OTHER PUBLICATIONS

Papavassiliou, Giorgos, et al., "Business Process Knowledge Modeling: Method and Tool," Proceedings of the 13th International Workshop on Database and Expert Systems Applications (DEXA '02), Sep. 2, 2002.

Delen, Dursun et al., "An Integrated Toolkit for Enterprise Modeling and Analysis," Proceedings of the 1999 Winter Simulation Conference, Dec. 5-8, 1999.

European Search Report for European Patent Application No. EP 05 11 1373, Microsoft Corporation, Aug. 1, 2006.

* cited by examiner

SYSTEM AND METHOD FOR INTERACTIVELY LINKING DATA TO SHAPES IN A DIAGRAM

TECHNICAL FIELD

The described technology is directed generally to computer graphical visualization programs and, more particularly, to linking data to shapes in a diagram.

BACKGROUND

Conventional drawing programs enable its user to create and edit diagrams by providing a variety of shapes or objects that can be selected and placed within the diagrams. The user can use a pointing device, such as a mouse, to orient and size the shapes and objects, such as squares, rectangles, circles, triangles, decision blocks, etc., in the diagram as desired.

Some of these conventional drawing programs provide a feature which allows users to associate data to the shapes and objects in a diagram. For example, these drawing programs may provide menus or wizards, which assist or guide users to associate external data to objects in a diagram, thus enhancing the value of the diagrams. One major drawback to using the menus or wizards to import external data into objects in a diagram is that the menus and wizards are not intuitive in their use and require a high level of familiarity with the structure of both the data and the details of the diagram. One factor contributing to this is that the menus and wizards are 'hidden' under several layers of obfuscated menus.

Another factor is that the menus and wizards are 'modal' user interfaces that do not allow the user to see the effects of the decisions they are making. This is because the modal window has to be closed—i.e., the user is finished with associating the data to an object in a diagram—before the user can continue to operate the drawing program. Stated another way, the user is unable to see the results of the data associate operation until the user is finished associating the data to the object in the diagram. Still another factor is that the menus and wizards do not provide a view into the data that could be easily used while manipulating the diagram.

Accordingly, a technique for allowing users to link data to diagrams and to quickly recognize the value of the data linked to diagrams through a discoverable, intuitive interface will have significant utility.

DETAILED DESCRIPTION

Figure 1:
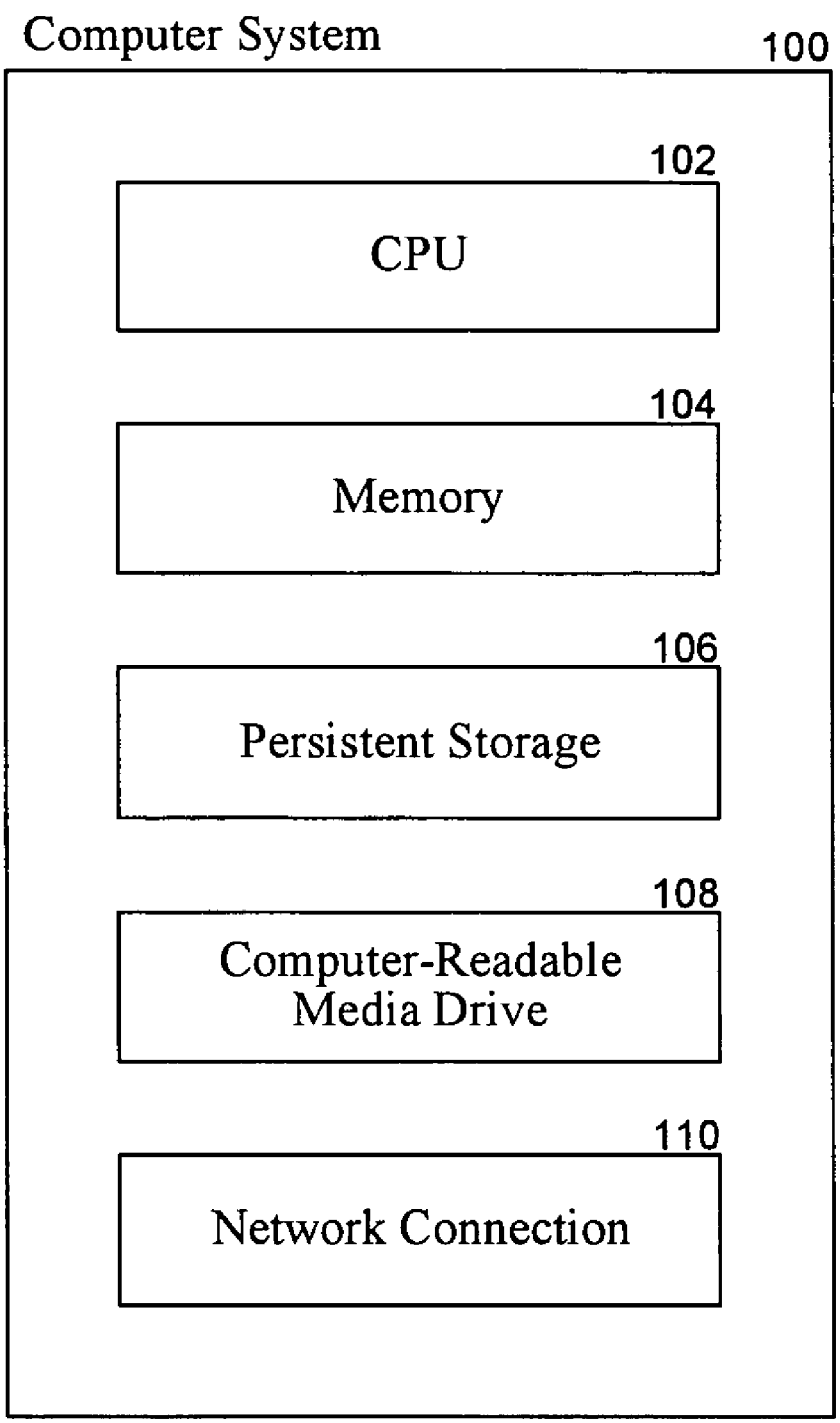
FIG. 1 is a block diagram illustrating selected components typically incorporated in at least some of the computer systems on which the facility executes.

Before describing the details of the current invention, some terminology used herein is described.

The term "connect" generally refers to the process of creating a relationship between a data source and a diagram.

The term "link" generally refers to a relationship between a row in a data source and a shape in a diagram. For example, linking a row to a shape causes custom properties to be populated with the values from the row.

The term "map" generally refers to the process of assigning a column to a property. For example, when a row is linked—e.g., associated—to a shape, each property of the shape is populated with the value from the column that is mapped to it.

The term "custom property name" generally refers to a string used internally to uniquely identify custom properties within a shape.

The term "refresh" generally refers to the process of updating a data source.

An external data linking software facility ("the facility") enables users to use an external data source to populate custom properties of shapes or diagram objects (hereinafter referred to as shapes) in a diagram. In various embodiments, the facility is implemented as a component of a graphical visualization program, and provides a modeless interface that allows users to perform a variety of actions on their diagram through a tabular view of the external data, which is displayed alongside the diagram. Users can use the modeless interface to import and display data from an external data source, and to link rows from the modeless interface to existing shapes in a diagram or to drag rows directly onto the drawing surface to place additional linked shapes in the diagram.

In one embodiment, the graphical visualization program provides a data selector wizard which enables its user to specify an external data source and the pieces of data in the external data source that is to be imported and displayed by the facility as a two dimensional table in the modeless user interface. Once the external data is displayed in the modeless interface, the facility provides two primary methods to create links between rows and shapes in a diagram: (1) create new shapes by dragging rows from the modeless interface onto a blank part of the drawing surface; and (2) manually linking by dragging rows from the modeless interface onto existing shapes in the diagram.

When a user drags a selection of rows from the modeless interface onto the drawing surface, the facility creates a shape for each of the rows. The facility determines the shape to use in representing the rows from the currently selected shape master in a shapes window of the graphical visualization program. A "master" is a shape on a stencil that a user uses repeatedly to create drawings. For example, when the user drags a shape from a stencil to a drawing, the shape becomes an instance of that master. If no shape master is selected, the facility uses a predetermined master, such as a rectangle master. If multiple masters are selected, the facility drops one of each master on the drawing surface for each row that was dragged. The facility then links the new shapes to the selected rows.

By way of example, assuming that two shape masters—e.g., a ShapeA and a ShapeB—are currently selected, if the user drags a single row—e.g., a Row1—from the modeless interface onto the drawing surface, the facility drops an instance of ShapeA and an instance of ShapeB on the drawing surface and links both of the shapes to Row1. If the user drags multiple rows—e.g., a Row1 and a Row2—from the modeless interface onto the drawing surface, the facility drops two instances of ShapeA and two instances of ShapeB on the drawing surface. The facility then links one ShapeA to Row1 and the other ShapeA to Row2, and one ShapeB to Row1 and the other ShapeB to Row2.

When the user drags a selection of rows from the modeless interface onto an existing shape in the diagram, the facility links the shape to the selected rows. In some embodiments, the facility enables the user to select multiple shapes or sub-shapes of a shape in the diagram and then drag a row or multiple rows onto the drawing surface. If multiple shapes are selected and the user drags a selection of rows over a shape in the selection, the facility links the topmost row that was dragged to the first shape in the selection, the next topmost row that was dragged to the next shape in the selection, and so on. If there is no next topmost row, the facility "cycles" the rows and links the topmost row that was dragged to the next shape in the selection.

In other embodiments, the facility provides a button containing a link icon next to each displayed row in the modeless interface that can be used to link a row or multiple rows to an existing shape in a diagram. For example, when the user uses a pointing device, such as a mouse, and clicks on the button containing the link icon, the facility selects the rows and changes the cursor to a "Link Tool" cursor. Then, when the user clicks or selects a shape in the diagram with the Link Tool, the facility links the shape to the selected rows.

Irrespective of the linking method used, the facility performs the following when a row is linked to a shape in a diagram:

If a link already exists between the shape and another row in the same data source, the facility provides a user an option to maintain or remove the link. In some embodiments, the facility removes the link by providing an indication next to each custom property that the link is broken or no longer exists.

Custom properties are added and populated.

Existing custom property values are overwritten, even if they were entered by a user or populated by rows in another data source.

The facility uses the column name to determine which values will populate which custom properties. If a custom property having the same label—i.e., name—as the column name exists, the facility populates that custom property with values from that column. If multiple custom properties having the same label as the column name exist, the facility populates all the custom properties that have the same label as the column name with values from that column. If no custom property has a label that matches a column, the facility creates a new custom property and populates the new custom property with values from that column.

A technical advantage is that the facility enables a user to intuitively associate external data with shapes in a diagram to create a highly informative image that can be analyzed and shared. The facility also provides a refresh or update feature that can be used to update the diagram when and/or if the external data changes. This vastly increases the value of the diagram since it is no longer a static image, but rather a living document that does not "stale."

In some embodiments, the facility provides a user the ability to change a name of a column in the modeless interface. If the user changes the name of a column, the new, transformed name is reflected in the label of the custom property that is created when a row from the data source is linked to a shape, or when the link is refreshed. Stated another way, the name of the custom property is the new, transformed name. Changing the name of a column in the modeless interface has no effect on the column name in the actual data source. This feature allows the user to work with column names that may be more descriptive, pleasant, and/or familiar than the names in used in the actual data source.

A user may be able to overwrite or change the values of custom properties which were created as a result of a link. For example, the graphical visualization program may provide a feature that enables the user to access and change the values of custom properties associated with a shape. In some embodiments, the facility does not reflect changes to the values of custom properties in the modeless interface. At refresh, the facility provides an option to overwrite or retain any of the manually made changes to the values. For example, if the user elects to retain the manually made changes, the manually entered values of the custom properties are not overwritten or replaced by the values in the modeless interface. Alternatively, if the user elects to overwrite the manually made changes, the custom properties are updated with their corresponding values from the modeless interface, thus resulting in the loss of the manually made changes.

In some embodiments, the facility provides a user the ability to link a single shape to multiple records from multiple data sources—i.e., one record each from a multiple number of distinct data sources. As a result, a custom property may be mapped to columns from multiple data sources. In this instance, the facility imposes an order or priority such that, duplicate columns—i.e., columns having the same label—are not duplicated in the custom properties, and the value from the last or most recently linked record takes priority. For example, assuming multiple columns in two different data sources have the same column name, and a row each from both of the data sources are linked to a shape, the facility only creates one custom property having a label that is the same as the column name. Moreover, the value of the custom property is the value from the column of the data source that is last linked or refreshed.

In some embodiments, the facility provides a user to activate and deactivate columns from the modeless interface, and the facility creates a custom property only for the activated columns. For example, the facility may provide a dialogue box that contains the list of the current names of all the columns in a data source and a checkbox next to each column name. Checking the checkbox next to a column name causes the column to appear in the modeless interface—i.e., causes the column to be activated—and be added as a custom property when rows are linked to shapes. Unchecking the checkbox causes the column not to appear in the modeless interface—i.e., causes the column to be deactivated—and prevents custom properties from being populated with values from this column when rows are linked to shapes. Stated another way, the facility does not create and/or link a custom property for deactivated columns.

The various embodiments of the facility and its advantages are best understood by referring to FIGS. 1-8 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects. By way of one such example, even though the examples generally refer to the linking or external data to custom properties of shapes, one skilled in the art will appreciate that the linking can be to properties of shapes, which may or may not include custom properties.

Figure 2:
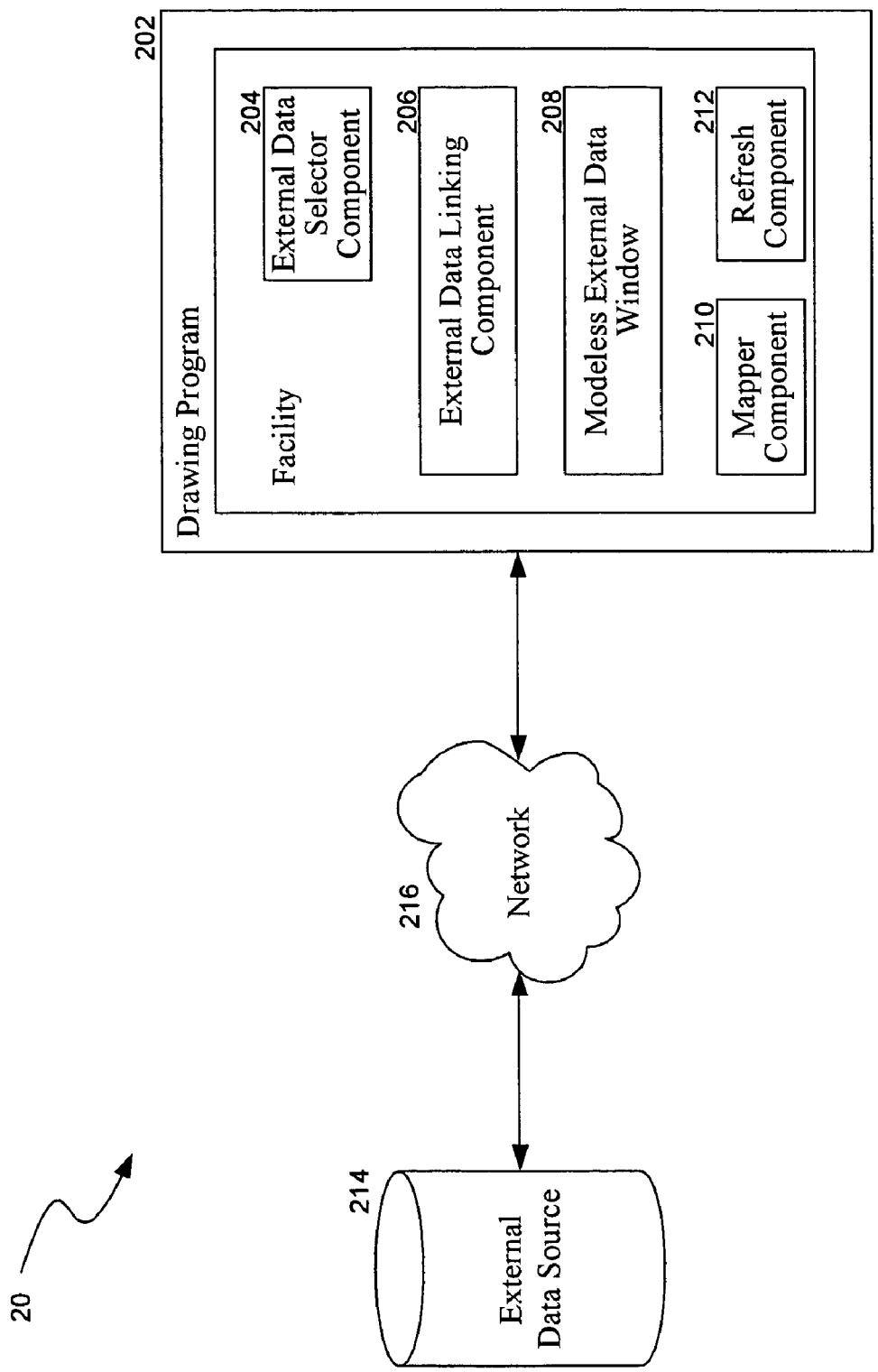
FIG. 2 is a high-level block diagram showing an environment in which components of the facility operate.

FIG. 2 is a high-level block diagram showing an environment 20 in which components of the facility operate. In general terms, environment 20 facilitates the creation of dynamic, data-driven diagrams for visualizing business information by providing a simple way for end users to get their data into their shapes. As depicted, environment 20 comprises a drawing program 202, an external data selector component 204, an external data linking component 206, a modeless external data window 208, a mapper component 210, a refresh component 212, and an external data source 214 coupled to drawing program 202 through a network 216. In particular, the facility is implemented as a component of drawing program 202 and comprises external data selector component 204, external data linking component 206, modeless external data window 208, mapper component 210 and refresh component 212.

Drawing program 202 generally functions as an application that provides its users the ability to draw diagrams, charts, graphs, and other drawings by providing templates, symbols and drag-and-drop drawing tools. One suitable drawing program is Microsoft® Visio® available from Microsoft Corporation of Redmond, Wash. One skilled in the art will appreciate that the facility may be readily implemented as a component of commercially available graphical visualization programs other than Microsoft® Visio®, as well as custom developed graphical visualization programs.

External data selector component 204 generally functions to import data from external data source 214 into modeless external data window 208. In some embodiments, external data selector component 204 is implemented as a wizard—i.e., a data selector wizard—and contains the logic to assist a user to specify, filter, and name a data source. For example, the user can specify a data source and the items or pieces of data in the data source that is to be imported as a two dimensional table. External data selector component 204 then establishes a connection with the data source and downloads the specified pieces of data. Upon receiving the pieces of data, external data selector component 204 launches modeless external data window 208 and displays the downloaded pieces of data as a two dimensional table in modeless external data window 208. In one embodiment, external data selector component 204 supports and utilizes Microsoft® ActiveX® Data Objects (ADO) to connect to and query external data source 214 for the user specified pieces of external data. One skilled in the art will appreciate that external data selector component 204 is not limited to using ADO, but may support and utilize other data access technologies to communicate with and import data from external data source 214.

External data linking component 206 generally functions to link data from modeless external data window 208 to new and existing shapes in a diagram. In some embodiments, external data linking component 206 creates links, removes links, creates custom properties, removes custom properties, and performs other actions to facilitate the linking of data from a data source to shapes in a diagram. External data linking component 206 is further described below.

Modeless external data window 208 generally functions as the primary interface for linking rows to new and existing shapes in a diagram. Modeless external data window 208 allows a user to interact outside the window—e.g., with either a secondary window or a primary window—even when modeless external data window 208 is displayed. For example, the user can switch between modeless external data window 208 and any other available window. In some embodiments, modeless external window 208 facilitates navigation of a data-connected diagram. For example, when a user uses a pointing device, such as a mouse, and double clicks a linked row in modeless external data window 208, the facility causes the linked shape to be displayed on the drawing surface of drawing program 202. Modeless external data window 208 may also provide a summary of the linking status through, for example, a visual indicator.

Mapper component 210 generally functions to allow a user to control the mapping of columns of data to custom properties. Refresh component 212 generally functions to refresh the data from external data source 214.

The aforementioned components of the facility are only illustrative, and the facility may include other components and modules not depicted. Furthermore, the functionality provided for in the components and modules may be combined into fewer components and modules or further separated into additional components and modules.

External data source 214 generally functions as a repository for the external data that is imported and displayed in modeless external data window 208. In one embodiment, external data source 214 may be a database management system that supports ADO, such as, by way of example, Microsoft® Access, or other relational data sources. One skilled in the art will appreciate that external data source 214 may support and utilize other data access technologies to communicate with and provide data to external data selector component 204.

Network 216 is a communications link that facilitates the transfer of electronic content between, for example, the attached computers. In one embodiment, network 216 includes the Internet. It will be appreciated that network 216 may be comprised of one or more other types of networks, such as a local area network, a wide area network, a point-to-point dial-up connection, and the like. It will also be appreciated that network 216 may not be present. For example, external data selector component 204 and external data source 214 may both reside on the same computing system and communicate via communication mechanisms, such as, interprocess communication, remote function call, internal communication buses, etc., typically supported on the computing system.

Figure 3:
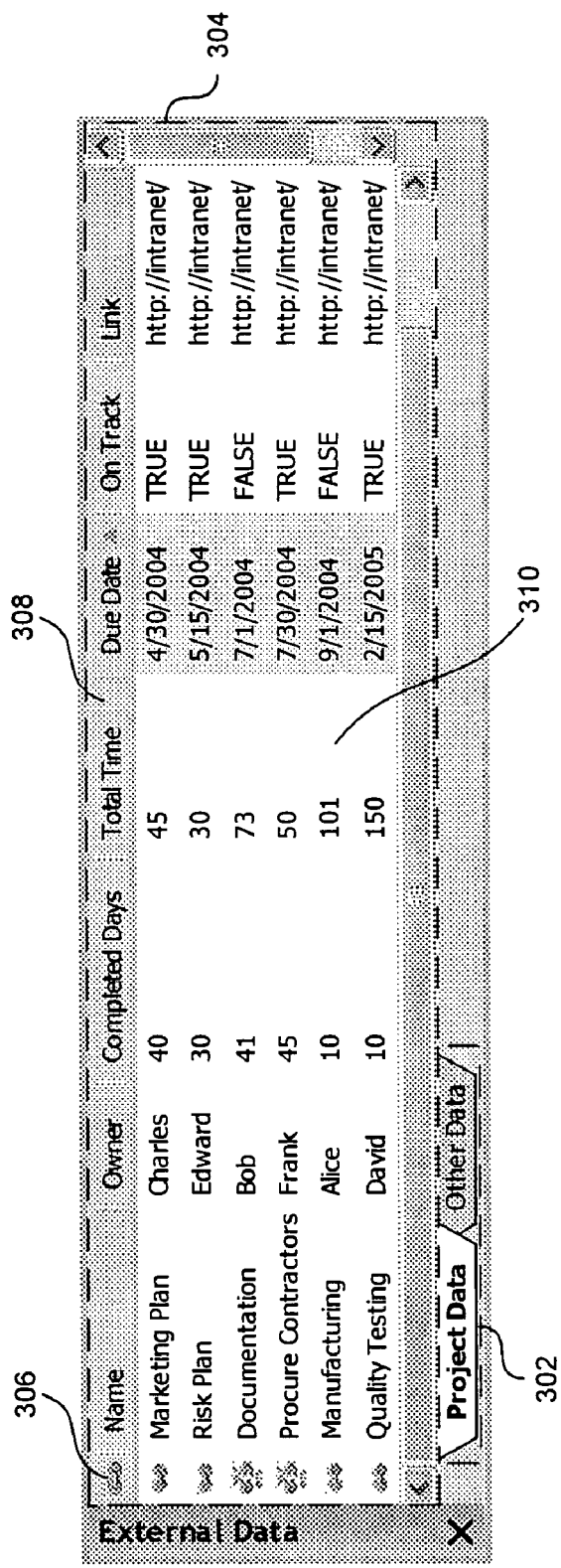
FIG. 3 is a display diagram showing an example modeless external data window.

FIG. 3 is a display diagram showing an example modeless external data window 208. In one embodiment, modeless external data window 208 is docked on the bottom of a document window—e.g., the window providing the drawing surface—of drawing program 202, and can be moved, resized, closed and retrieved. Modeless external data window. 208 is visible when the document window that was active when modeless external data window 208 was launched is active. Moreover, if multiple document windows are used to view the same document—e.g., diagram—each document window has its own modeless external data window 208. Further, closing modeless external data window 208 has no effect on the diagram or the connections to any data sources.

As depicted, modeless external data window 208 comprises data source tabs 302 and a data grid 304. Data source tabs 302 generally function to provide the ability to switch between multiple connected data sources. For example, clicking on a data source tab causes the content of data grid 304 to change to reflect the data from the selected data source. Data grid 304 generally functions to provide a table view of the data from the external data source that has its data source tab 302 currently selected. In one embodiment, data grid 304 comprises link icons 306, column headers 308, and data cells 310.

In one embodiment, each row of data cells 310 is provided its own link icon 306, which indicates whether or not the row is linked. As depicted, a connected chain indicates that the row is currently linked, while a broken chain indicates that the row is not linked. In the example modeless external data window 208 in FIG. 3, the row having the column name "Marketing Plan" is currently linked, while the row having the column name "Documentation" is not currently linked to any shape.

Column headers 308 generally function to display the names of the active columns. In one embodiment, the text in column headers 308 is the original name of the columns from the data source. In the example modeless external data window 208 in FIG. 3, the names of the active columns as indicated by the text in column headers 308 are "Name," "Owner," "Completed Days," "Total Time," "Due Date," "On Track," and "Link," and these names may be the original names of the columns from the data source.

In some embodiments, the facility may provide a user the ability to change the name of the columns. For example, the facility may provide a dialogue window that the user can launch and through which the user can select a column and edit the name of the column. The edited or transformed name of the column is displayed in column headers 308, but not reflected back in the data source. Moreover, when the link is refreshed, the edited name of the column is reflected in the label or name of a custom property.

The facility may also provide the user the ability to activate and deactivate columns, causing the columns to either be displayed or not displayed in modeless external data window 208. In one embodiment, activating/deactivating a column also indicates if that column participates in the linking. Deactivated columns do not get applied to a shape during a link. For example, the facility may provide a dialogue window that lists the columns in the data source, and through which the user can specify or select the columns that are to be active and displayed in modeless external data window 208. Moreover, at any time while the data source is active—i.e., data source tab 302 for the data source is currently selected—the user can use the dialogue window and alter the selection of active columns. The facility reflects the changes in modeless external data window 208.

Figure 4:
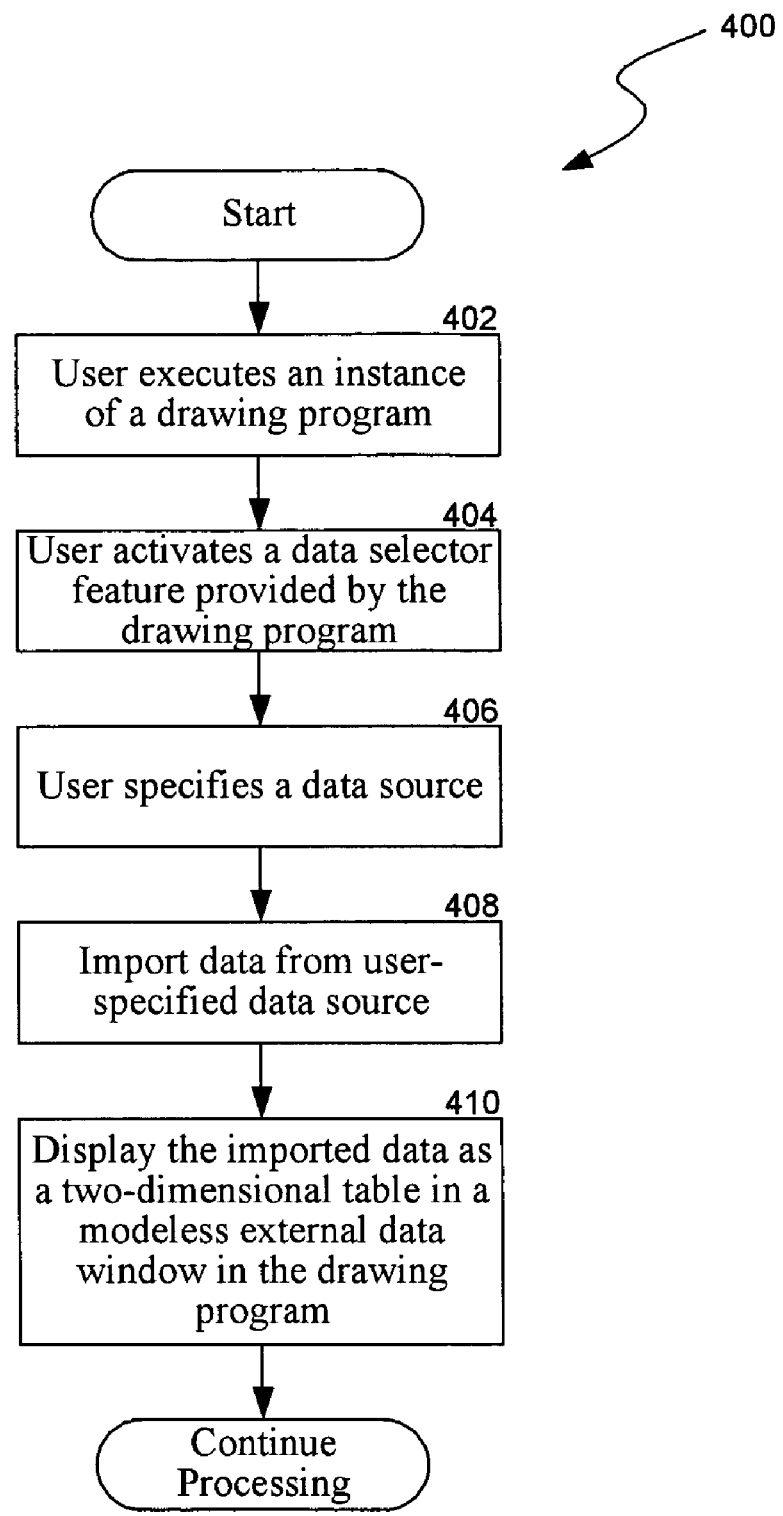
FIG. 4 illustrates a flow chart of a method by which a facility imports data from an external data source into a modeless external data window, according to some embodiments.

FIG. 4 illustrates a flow chart of a method 400 by which the facility imports data from an external data source into modeless external data window 208, according to some embodiments. By way of example, a program manager in charge of a large development project may want to present project status information that is currently maintained in a spreadsheet, such as an Excel spreadsheet, in a data connected diagram in order to improve the focus and readability of project information. At step 402, the program manager executes an instance of drawing program 202 on a computing system.

At step 404, the program manager activates a data selector feature, such as external data selector component 204 of the facility. At step 406, the program manager specifies an external data source. For example, the program manager can use external data selector component 204 and specify the location and name of the Excel spreadsheet program and data file that contains the project information.

At step 408, the facility imports the data from the specified data source. For example, external data selector component 204 can establish a connection with a computing system hosting the spreadsheet program and request or query the specified data file. At step 410, the facility displays the imported data as a two dimensional table in a modeless window—i.e., an interactive display. For example, the facility can launch an instance of modeless external data window 208 and display the imported project information as a two dimensional table in modeless external data window 208 to the program manager.

One skilled in the art will appreciate that, for this and other methods and processes disclosed herein, the functions performed in the exemplary flow charts may be implemented in differing order. Furthermore, the steps outlined in the flow charts are only exemplary, and some of the steps may be optional, combined into fewer steps, or expanded into additional steps without detracting from the essence of the invention.

Figure 5:
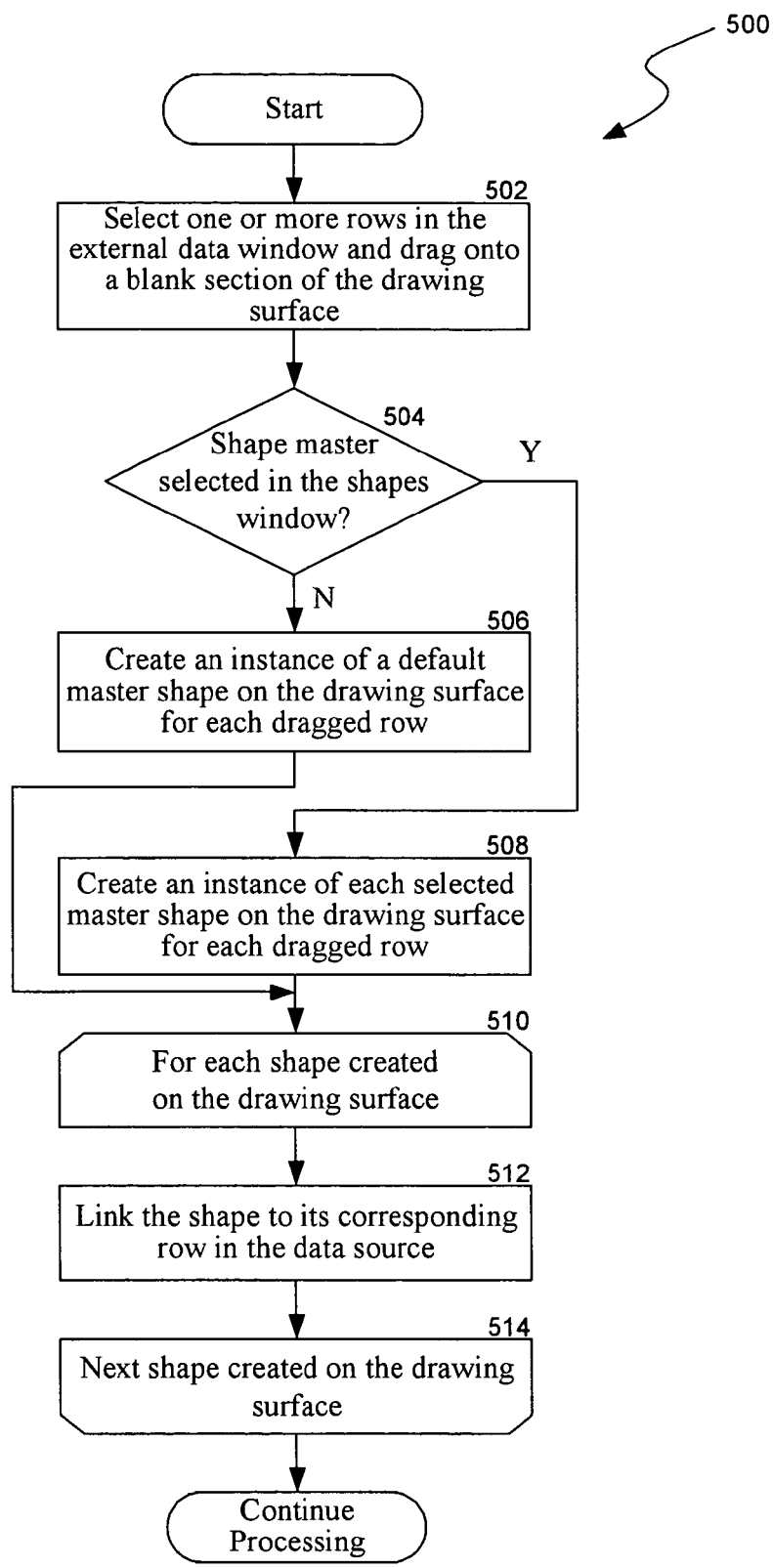
FIG. 5 illustrates a flow chart of a method by which the facility creates new shapes in a diagram from rows in a modeless external data window, according to some embodiments.

FIG. 5 illustrates a flow chart of a method 500 by which the facility creates new shapes in a diagram from rows displayed in modeless external data window 208, according to some embodiments. Continuing the program manager example, the program manager may want to display the project information through a data connected diagram, such as a connected graph, in order to improve the readability of the information. Further, because the connect graph does not exist and, thus, needs to be drawn, the program manager may want to create the connected graph by dragging rows of information displayed in modeless external data window 208 to the drawing surface to create the shapes that will comprise the connected graph.

At step 502, the program manager uses a pointing device, such as a mouse, and selects a row or rows in modeless external data window 208, and drags the selected rows onto a blank section of the drawing surface. At step 504, the facility checks to determine whether a shape master in a shapes window is currently selected. Drawing program 202 typically provides a shapes window that contains shape masters or stencils of shapes that are made available to users for drawing.

If no shape master is currently selected, then, at step 506, the facility creates an instance of a default master shape, such as a rectangle, on the drawing surface for each dragged row. In the program manager example, assuming that the project information is as shown in the example modeless external data window 208 in FIG. 3, and that the program manager selected and dragged the rows having the column names "Marketing Plan" and "Risk Plan" on to the blank section of the drawing surface, the facility creates two separate instances of a rectangle on the drawing surface. The facility associates one instance of the rectangle to the row having the column name "Marketing Plan," and associates the other instance of the rectangle to the row having the column name "Risk Plan."

Otherwise, if a shape master is currently selected, then, at step 508, the facility creates an instance of each selected master shape on the drawing surface for each dragged row. Continuing the program manager example, assuming that the two master shapes, such as a rectangle and a square, are currently selected, and the program manager selected and dragged the rows having the column names "Marketing Plan" and "Risk Plan" (form the example modeless external data window 208 in FIG. 3) on to the blank section of the drawing surface, the facility creates two separate instances of a rectangle and two separate instances of a square on the drawing surface. The facility associates one instance of the rectangle to the row having the column name "Marketing Plan," associates the other instance of the rectangle to the row having the column name "Risk Plan," associates one instance of the square to the row having the column name "Marketing Plan," and associates the other instance of the square to the row having the column name "Risk Plan." Thus, each row is associated with an instance of the rectangle and an instance of the square.

Subsequent to creating the shape or shapes on the drawing surface at either step 506 or step 508, the facility, for each shape created on the drawing surface (step 510), performs step 512, until all the shapes created on the drawing surface are processed (step 514). At step 512, the facility links the shape to its corresponding row in modeless external data window 208, and proceeds to process the next shape created on the drawing surface (step 514). Continuing the program manager example from step 506 above, the facility links one instance of the rectangle to the row having the column name "Marketing Plan," and links the other instance of the rectangle to the row having the column name "Risk Plan." The linking operation is further described below in conjunction with method 700 in FIG. 7.

Figure 6:
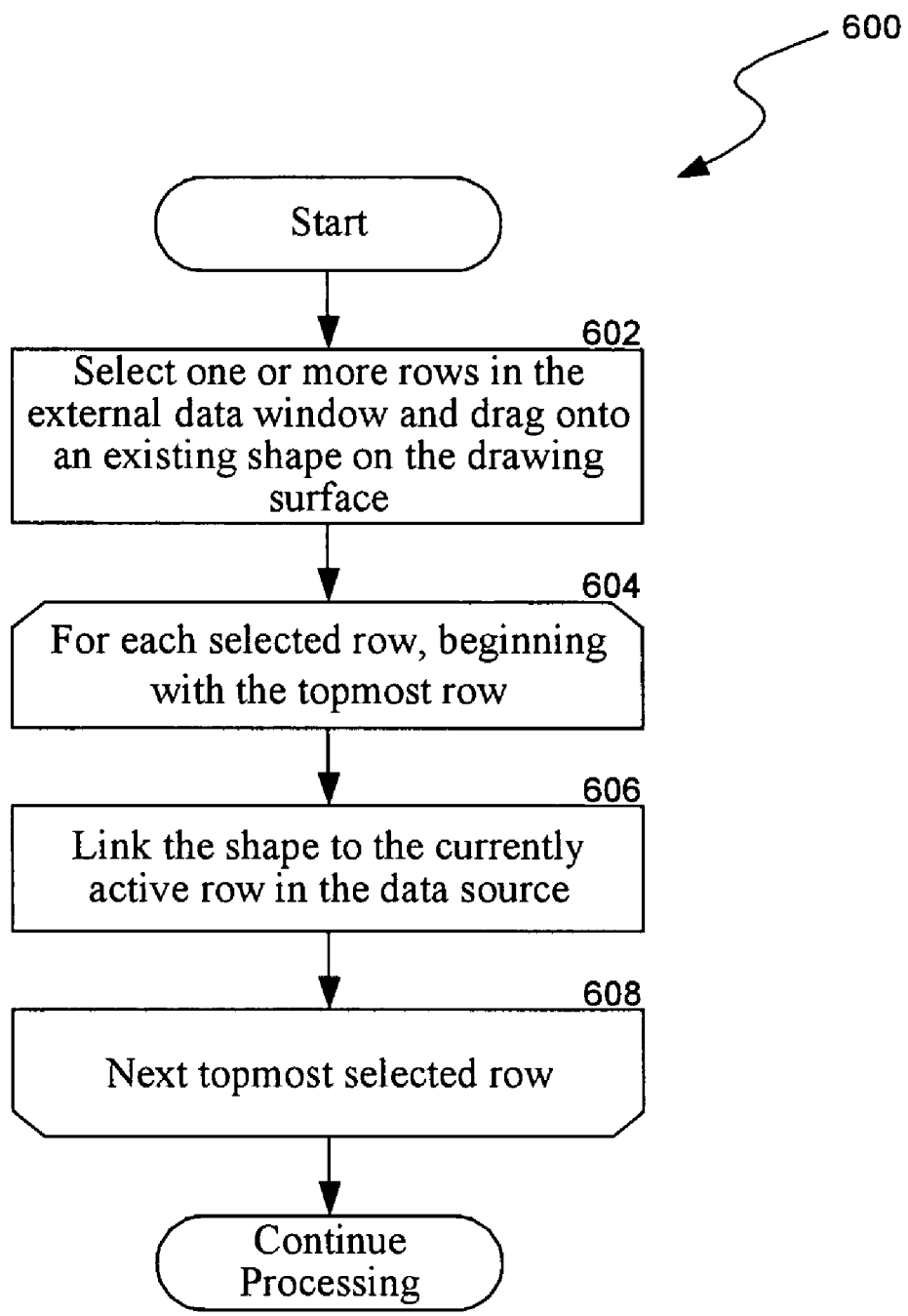
FIG. 6 illustrates a flow chart of a method by which the facility manually links rows in a modeless external data window to existing shapes in a diagram, according to some embodiments.

FIG. 6 illustrates a flow chart of a method 600 by which the facility manually links rows in modeless external data window 208 to existing shapes in a diagram, according to some embodiments. In the program manager example above, the program manager may have previously created the diagram for use in improving the readability of the project information. Further, this diagram may include a rectangle, which is currently displayed on the drawing surface.

At step 602, the program manager uses a pointing device and selects a row or rows in modeless external data window 208, and drags the selected rows onto an existing shape that is displayed on the drawing surface. In the program manager example, assuming that the project information is as shown in the example modeless external data window 208 in FIG. 3, the program manager may have selected and dragged the rows having the column names "Marketing Plan" and "Risk Plan" on to the rectangle that is currently displayed on the drawing surface.

Then, beginning with the topmost selected row and working down in sequence (step 604), the facility performs step 606, until all the selected rows are processed (step 608). At step 606, the facility links the shape to the currently active row—i.e., the selected and dragged row currently being processed—in modeless external data window 208, and proceeds to process the next dragged row (step 608). Continuing the program manager example, the facility first identifies the topmost selected row, which is the row having the column name "Marketing Plan," as the currently active row and links this row to the rectangle. The facility then identifies the next topmost selected row, which is the row having the column name "Risk Plan," as the currently active row and links this row to the rectangle. The facility continues processing in this manner until all the selected and dragged rows are processed.

In other embodiments, the facility may prompt a user to determine if the user wishes to replace the existing links. For example, the facility may present a dialog with the following options: (1) yes replace; (2) no replace; (3) yes replace always; and (4) no replace always. In still other embodiments, the facility may support "manual linking" where a user first selects shapes and/or sub-shapes from the drawing page, select one or more rows in modeless external data window 208, and then selects an option to link the rows to the selected shapes.

One skilled in the art will appreciate that the program manager can select any number of rows and drag the selected rows onto either the blank section of the drawing surface or a shape in a diagram. Moreover, the program manager can repeated the select and drag operation as desired using different combination and numbers of rows and shapes.

In some embodiments, the facility allows a user to select and drag a row or multiple rows onto multiple shapes in a diagram. Here, the facility establishes an order to the multiple shapes that are selected and links the topmost row that was dragged to the first shape in the selection, the next topmost row that was dragged to the next shape in the selection, and so on. If there is no next topmost row, the facility cycles the rows and links the topmost row that was dragged to the next shape in the selection, and so on until each of the selected shapes have been linked. In the program manager example, assuming that three shapes, the rectangle, a square, and a trapezoid are displayed on the drawing surface, the program manager may have selected the three shapes and dragged the rows having the column names "Marketing Plan" and "Risk Plan" on to the selected shapes on the drawing surface. In this instance, the facility may order the shapes in the sequence rectangle, square, and trapezoid, and link the topmost selected row, which is the row having the column name "Marketing Plan," to the rectangle, and link the next topmost selected row, which is the row having the column name "Risk Plan," to the square, which is the next shape in the sequence. Because there is no next topmost row, the facility cycles through the rows and links the next topmost selected row, which is the row having the column name "Marketing Plan," to the trapezoid.

Figure 7:
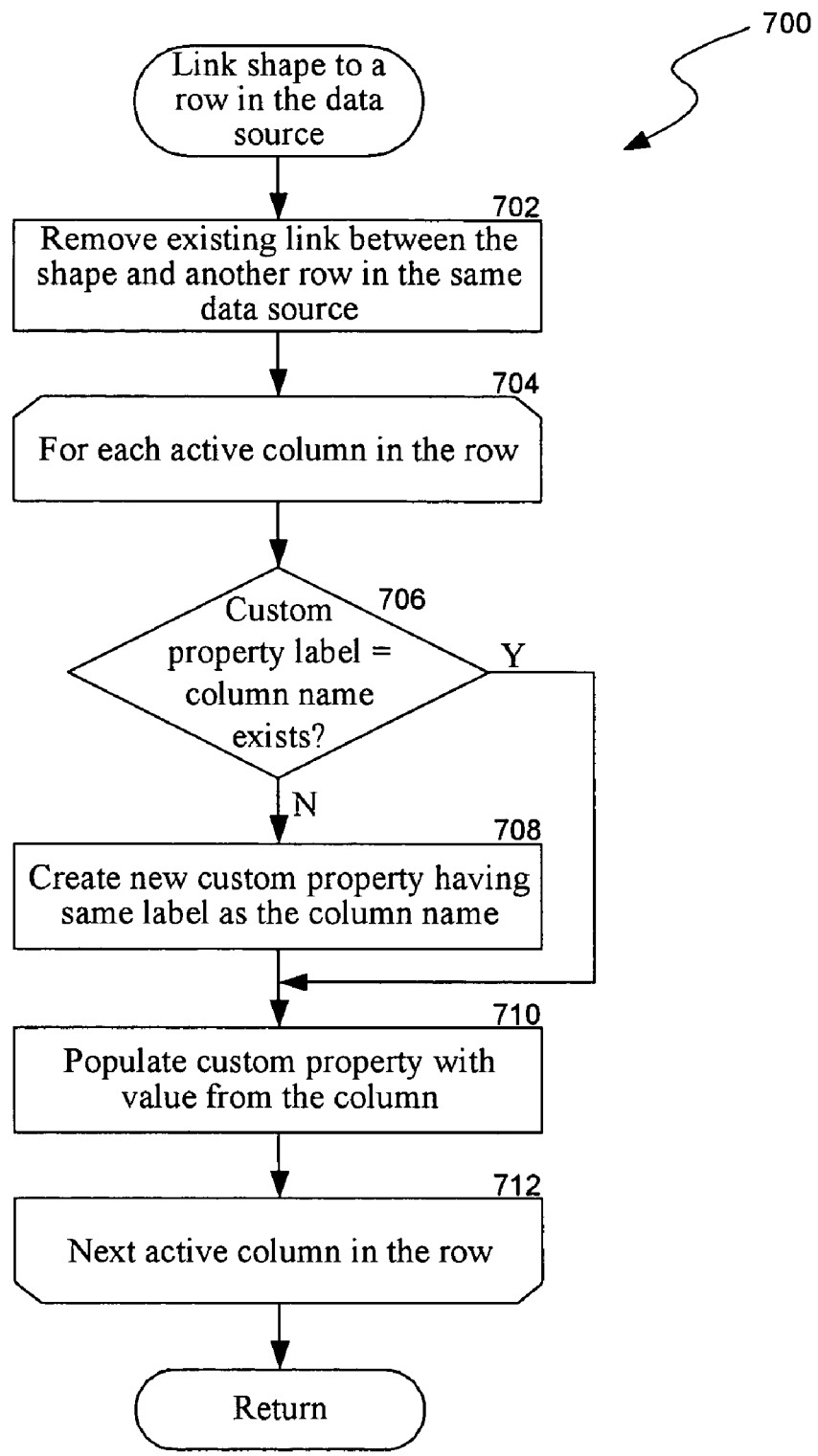
FIG. 7 illustrates a flow chart of a method by which the facility performs a linking operation, according to some embodiments.

FIG. 7 illustrates a flow chart of a method 700 by which the facility performs a linking operation, according to some embodiments. In particular, method 700 illustrates a linking between a row and a shape in a diagram. In some embodiments, external data linking component 206 of the facility only links active columns—i.e., the columns that are currently displayed in modeless external data window 208 to the shapes in a diagram. At step 702, external data linking component 206 removes any existing links between the shape and another row in the same data source. In one embodiment, for each row whose link is removed, external data linking component 206 may check to determine whether the row is linked to any other shapes, and if the row is not linked to any other shapes, external data linking component 206 indicates in the row's link icon 306 that the row is not currently linked.

Then, for each active column in a row that is to be linked (step 704), external data linking component 206 performs steps 706 to 710, until all the active columns in the row is processed (step 712). At step 706, external data linking component 206 checks to determine whether the shape currently has a custom property having a label or name that is the same as the column name. If the shape does not have a custom property with the same name as the column, then, at step 708, external data linking component 206 creates a custom property for the shape, and gives newly created custom property the same name as the column.

If, at step 706, external data linking component 206 determines that the shape currently has a custom property with a name that is the same as the column name, or subsequent to creating a custom property for the shape and giving it the same name as the column at step 708, then, at step 710, external data linking component 206 populates the custom property with the value from the column—i.e., data cell 310 corresponding to the column—and proceeds to process the next active column (step 712). In other embodiments, data type may also be used as a secondary test to determine if a existing property should be used and filled with the data in the matching column row. Subsequent to linking the active columns in the row, external data linking component 206 indicates in the row's link icon 306 that the row is currently linked.

Continuing the program manager example from step 606 above, external data linking component 206 needs to first link the rectangle to the topmost selected row, which is the row having the column name "Marketing Plan," and then link the same rectangle to the next topmost selected row, which is the row having the column name "Risk Plan." In processing the topmost row, if the rectangle is currently linked to any of the other records—e.g., any one of the records having column names "Manufacturing" or "Quality Testing"—in modeless external data window 208, external data linking component 206 removes this link. The records having column names "Documentation" and "Procure Contractors" are not linked as indicated by their respective link icons 306. External data linking component 208 then links the rectangle to the topmost row. Subsequent to the linking operation, the custom properties and their values for the rectangle may be as follows:

| Custom Properties | Value |
| --- | --- |
| Name | Marketing Plan |
| Owner | Charles |
| Completed Days | 40 |
| Total Time | 45 |
| Due Date | Apr. 30, 2004 |
| On Track | TRUE |
| Link | http://intranet/Marketing |

Subsequent to linking the rectangle to the topmost row, external data linking component 206 links the rectangle to the next topmost selected row. In processing the next topmost selected row, external data linking component 206 starts by removing the currently existing link between the rectangle and the row having the column name "Marketing Plan." In some embodiments, external data linking component 206 may provide an indication next to each custom property that the link no longer exists and that the data—i.e., displayed value—may be stale—e.g., data may no longer be current. In other embodiments, external data linking component 206 may remove or delete the custom property or properties which were created from the link that was removed. External data linking component 208 then links the rectangle to the next topmost row. Subsequent to the linking operation, the custom properties and their values for the rectangle may be as follows:

| Custom Properties | Value |
| --- | --- |
| Name | Risk Plan |
| Owner | Edward |
| Completed Days | 30 |
| Total Time | 30 |
| Due Date | May 15, 2004 |
| On Track | TRUE |
| Link | http://intranet/Risk |

In some embodiments, the facility allows a user to link a single shape to multiple records from multiple data sources. Continuing the program manager example, the program manager may have then used external data selector component 204 and imported another Excel data file containing other project information. For example, the project information may include contact information, such as an office location and phone number, for each of the owners, as follows:

| Owner | Office Location | Phone Number |
| --- | --- | --- |
| Charles | Bldg 1-23 | (123)456-2763 |
| Edward | Bldg 1-14 | (123)456-2753 |
| Bob | Bldg 2-5 | (123)456-2842 |
| Frank | Bldg 1-28 | (123)456-2790 |
| Alice | Bldg 3-17 | (123)456-6340 |
| David | Bldg 2-9 | (123)456-2872 |

The program manager may then may have selected and dragged the row having the column owner "Edward" on to the rectangle that is currently displayed on the drawing surface, causing external data linking component 206 to link the rectangle to the row. Subsequent to the linking operation, the custom properties and their values for the rectangle may be as follows:

| Custom Properties | Value |
| --- | --- |
| Name | Risk Plan |
| Owner | Edward |
| Completed Days | 30 |
| Total Time | 30 |
| Due Date | May 15, 2004 |
| On Track | TRUE |
| Link | http://intranet/Risk |
| Office Location | Bldg 1-14 |
| Phone Number | (123)456-2753 |

Moreover, external data linking component 206 does not remove the previously existing link because the link was between the rectangle and a row in a different data source. Thus, the custom properties that were created as a result of the previous link remain linked subsequent to the most recent link operation. Further, external data linking component 206 does not create a duplicate custom property having the name "Owner" because the custom property already existed. The value of the duplicate custom property—i.e., the custom property with the name "Owner"—is the value from the data source that is most recently linked—i.e., the project information for the contact information for each of the owners. In other embodiments, external data linking component 206 may not update the value of duplicate custom properties, but maintain the prior, existing value.

Figure 8:
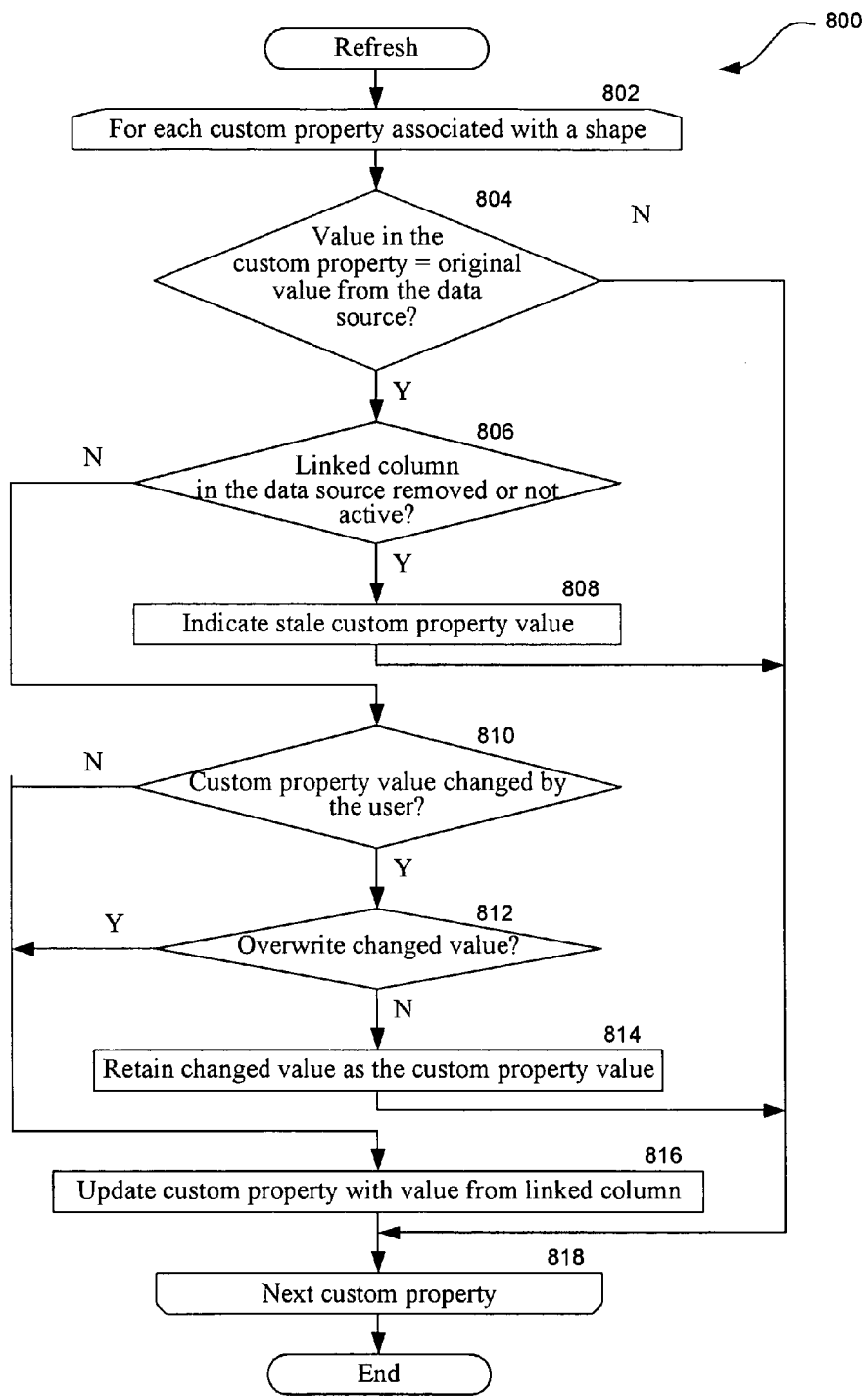
FIG. 8 illustrates a flow chart of a method by which the facility refreshes a link, according to some embodiments.

FIG. 8 illustrates a flow chart of a method 800 by which the facility refreshes a link, according to some embodiments. In some embodiments, the facility may provide a button or other activation device that a user may use to initiate a refresh operation. By way of example, a user may select a shape in a diagram and press a refresh button using a pointing device to initiate a refresh operation. If the selected shape is linked to multiple rows of data from multiple data sources, the facility provides the user the ability to select a single data source to refresh from. For example, the facility may list the multiple data sources in a window and allow the user to select a single data source. In other embodiments, the facility may refresh the link to multiple data sources in sequence, one after another.

For each custom property associated with the selected shape (step 802), the facility performs steps 804 to 816, until all the custom properties associated with the selected shape are processed (step 818). At step 804, the facility checks to determine whether or not the value in the custom property is the same as the original value from the data source. If it is not the same, the custom property value remains unchanged, and the facility proceeds to process the next custom property (step 818).

Otherwise, if the custom property value is the same as the original value from the data source, then, at step 806, the facility determines whether the column linked to the custom property is currently not active and, thus, not displayed in modeless external data window 208. If the linked column is currently not an active column, then, at step 808, the facility indicates that the value of the custom property is stale, and proceeds to process the next custom property (step 818).

Otherwise, if the linked column is currently an active column, then, at step 810, the facility determines whether the value of the custom property was changed, for example, by the user. If the value of the custom property was not changed, then, at step 818, the facility updates or refreshes the value of the custom property with the value from the linked column in the data source, and proceeds to process the next custom property (step 818).

Otherwise, if the value of the custom property was changed, then, at step 812, the facility determines whether the user elected to update the value of the custom property. If the facility determines that the user elected to update the value of the custom property, then, at step 816, the facility updates the value of the custom property with the value from the linked column in the data source, and proceeds to process the next custom property (step 818). Otherwise, at step 814, the facility retains the current value of the custom property, and proceeds to process the next custom property (step 818).

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium whose contents cause a computer to:
   execute an instance of a graphical visualization program, the graphical visualization program having a drawing surface and being operable to display a diagram having at least one shape on the drawing surface; and
   within the instance of the graphical visualization program,
      import data from a first data source external to the graphical visualization program;
      select a master shape from a plurality of different shapes; and
      display the imported data from the first external data source as a first two dimensional table in an interactive display within the instance of the graphical visualization program, the first two dimensional table having one or more rows and one or more columns;
      in response to at least one row from the two dimensional table in the interactive display being dragged and dropped onto the drawing surface,
         when the row is dropped over a blank area of the display surface, create a new shape on the drawing surface where the row is dropped over the drawing surface, the newly created shape being the master shape when a master shape is selected and being a default shape when a master shape is not selected, and create new links by populating custom properties of the created shape with data from the dragged and dropped row;
         when the row is dropped over an existing shape of the display surface, remove existing links between the at least one shape and another row in the two dimensional table and create new links by populating custom properties of the at least one shape with data from the dragged and dropped at least one row.

2. The computer-readable storage medium of claim 1 further comprising contents that cause the computer to:
   within the instance of the graphical visualization program, import data from a second external data source;
   display the imported data from the second external data source as a second two dimensional table in the interactive display within the instance of the graphical visualization program, such that the interactive display displays either the imported data from the first external data source or the imported data from the second external data source.

3. The computer-readable storage medium of claim 1, wherein each row in the interactive display is provided a link icon.

4. The computer-readable storage medium of claim 1, wherein at least one column in the interactive display can be excluded.

5. The computer-readable storage medium of claim 1, wherein the link is between a property of the shape and a value from a column in the row from the two dimensional table in the interactive display.

6. The computer-readable storage medium of claim 5, wherein the property and the column have the same name.

7. The computer-readable storage medium of claim 1, such that a plurality of rows from the two dimensional table in the interactive display can be associated to a plurality of new shapes in a diagram by:
   creating an instance of new shapes on the drawing surface for each row; and
   for each shape, linking the shape to its corresponding row.

8. The computer-readable storage medium of claim 1, such that a plurality of rows from the two dimensional table in the interactive display can be associated to a plurality of preexisting shapes in a diagram by:
  establishing an order to the plurality of shapes;
  establishing an order to the plurality of rows; and
  beginning with a first shape and a first row, and proceeding in order until all of the plurality of shapes are associated while cycling through the plurality of rows as needed, linking the shape to the row.

9. A computer-readable storage medium whose contents cause a graphical visualization program to link data from an external data source to a shape in a diagram by:
  displaying data from a first external data source as a first two dimensional table in a data grid of an interactive display; and
  responsive to a row or multiple rows of the first two dimensional table in the data grid of the interactive display being dragged onto a blank section of a drawing surface:
    creating an instance of a shape on the drawing surface for each row dragged onto the drawing surface, the shape for the instance being a master shape when a user has selected a master shape from a plurality of shapes and being a default shape when the user has not selected a master shape; and
    for each shape created on the drawing surface, linking the shape to the row by, for each column in the row:
      responsive to determining that a property of the shape exists that has a name that is the same as a name of the column, populating the property with a value from the column;
      responsive to determining that a property of the shape does not exist that has a name that is the same as a name of the column, creating a new property having a name that is the same as the name of the column for the shape, and populating the new property with a value from the column; and
  responsive to a second row of the first two dimensional table in the data grid of the interactive display being dragged onto the existing shape being displayed on the drawing surface, linking the existing shape to the second row by:
    removing the link between the existing shape and the first row; and
    for each column in the second row:
      responsive to determining that a property of the existing shape that has a name that is the same as a name of the column exists, populating the property with a value from the column; and
      responsive to determining that a property of the existing shape that has a name that is the same as a name of the column does not exist, creating a new property having a name that is the same as the name of the column for the existing shape, and populating the new property with a value from the column.

10. The computer-readable storage medium of claim 9 further comprising contents that cause the graphical visualization program to link data from an external data source to a shape in a diagram by:
  responsive to a first row of the first two dimensional table in the data grid of the interactive display being dragged onto an existing shape being displayed on the drawing surface, linking the existing shape to the first row by, for each column in the first row:
    responsive to determining that a property of the existing shape exists that has a name that is the same as a name of the column, populating the property with a value from the column; and
    responsive to determining that a property of the existing shape does not exist that has a name that is the same as a name of the column, creating a new property having a name that is the same as the name of the column for the existing shape, and populating the new property with a value from the column.

11. The computer-readable storage medium of claim 9, wherein removing the link between the existing shape and the first row further causes providing an indication by each property in a view that shows the values of the properties.

12. The computer-readable storage medium of claim 9, wherein the link between the existing shape and the first row is removed by removing the custom properties created as a result of the link between the existing shape and the first row.

13. The computer-readable storage medium of claim 9, wherein the linking is only of active columns in the row.

14. A computing device for generating a diagram with links to external data, the computing device comprising:
  a drawing program component that displays a drawing surface to which instances of shapes of the diagram are to be added, the drawing program providing a plurality of different shapes;
  an external data selector component that receives from a user an indication of an external data source, establishes a connection with the external data source, retrieves data of the external data source, and launches a modeless external data window with a two-dimensional table with rows and columns, each row corresponding to a row of the external data source and each column corresponding to a column of the external data source, the modeless external data window allowing a user to manipulate the drawing surface while the modeless external data window is open;
  a modeless external data window component that allows the user to select a row of the two-dimensional table and to drag that row to the drawing surface;
  a component that allows selection of a shape master from the plurality of different shapes;
  a external data linking component that when a row of the two-dimensional table is dragged to the drawing surface, links data from that row of the two-dimensional table to a shape of the diagram;
  a component that allows dragging and dropping of a row of the two-dimensional table onto a blank area of the drawing surface;
  a component that, upon detecting that a row has been dropped onto a blank area of the drawing surface,
    when a shape master has been selected, creates an instance of the selected shape master on the drawing surface to represent the dragged row; and
    when a shape master has not been selected, creates an instance of a default shape master on the drawing surface to represent the dragged row;
  a component that, upon detection that a row has been dropped on an existing shape, unlinks data from the existing shape so that the data of the dragged row can be linked;
  a mapper component that maps columns of the row of the two-dimensional table to which an instance of a shape is linked to properties of the instance of the shape and sets a value of a property to a value of the row of the column to which the property is mapped; and a refresh component that refreshes values of properties from the external data source from which the data of the two-dimensional table was retrieved
wherein different rows that are dragged and dropped onto the display surface can be represented by instances of different master shapes.

15. The computing device of claim 14 wherein when the row is dropped over an existing instance of a shape on the surface, the mapper component maps columns to properties with the same name and creates a new property when no property with the same name as a column currently exists.

16. The computing device of claim 14 wherein when the row is dropped over an area of the drawing surface that does not contain an instance of a shape, a new instance of a shape is created with properties having the same names as the names of the columns.

17. The computing device of claim 16 wherein the newly creates instance of a shape corresponds to a currently selected master shape.

18. The computing device of claim 16 wherein when multiple master shapes are currently selected, a new instance of a shape is created for each selected shape for each row that is dragged and dropped.

19. The computing device of claim 14 wherein when multiple rows are dropped over an area of the drawing surface that does not contain a shape, a new instance of each master shape is created for each row, each new instance of a master shape with properties having the same names as the names of the columns.

* * * * *